United States Patent
Smith et al.

(10) Patent No.: US 11,208,945 B1
(45) Date of Patent: Dec. 28, 2021

(54) SHUTTER SYSTEM FOR A MOTOR VEHICLE

(71) Applicant: GM Global Technology Operations LLC, Detroit, MI (US)

(72) Inventors: Michael A. Smith, Clarkston, MI (US); Richard J. Lopez, Bloomfield, MI (US); Rolf B. Karlsson, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/007,291

(22) Filed: Aug. 31, 2020

(51) Int. Cl.
| | |
|---|---|
| *F02M 35/10* | (2006.01) |
| *F01P 7/10* | (2006.01) |
| *F02D 41/10* | (2006.01) |
| *B60K 11/04* | (2006.01) |
| *B60K 11/08* | (2006.01) |
| *F02B 29/04* | (2006.01) |
| *F01P 5/06* | (2006.01) |
| *F01P 3/18* | (2006.01) |

(52) U.S. Cl.
CPC .............. *F01P 7/10* (2013.01); *B60K 11/04* (2013.01); *B60K 11/085* (2013.01); *F01P 3/18* (2013.01); *F01P 5/06* (2013.01); *F02B 29/0406* (2013.01); *F02M 35/1038* (2013.01); *F02M 35/10157* (2013.01); *F01P 2025/13* (2013.01); *F01P 2025/42* (2013.01); *F01P 2025/66* (2013.01)

(58) Field of Classification Search
CPC .... F02D 41/0007; F02D 41/144; F02D 23/00; F02M 35/10157; F02M 35/1038; F02M 26/30; F01P 2060/02
See application file for complete search history.

(56) References Cited

U.S. PATENT DOCUMENTS

| | | | |
|---|---|---|---|
| 10,247,149 B2 * | 4/2019 | Nemesh | F02M 31/205 |
| 2010/0050997 A1 * | 3/2010 | Huber | F02B 29/0425 |
| | | | 123/563 |
| 2014/0100074 A1 * | 4/2014 | Glugla | B60W 30/18 |
| | | | 477/3 |
| 2014/0325959 A1 * | 11/2014 | McConville | F02B 29/0431 |
| | | | 60/273 |
| 2015/0176480 A1 * | 6/2015 | Maceroni | F02B 33/44 |
| | | | 60/599 |
| 2015/0285128 A1 * | 10/2015 | Cardwell | F28F 17/005 |
| | | | 60/599 |
| 2018/0112633 A1 * | 4/2018 | Keating | G08B 29/20 |
| 2019/0003379 A1 * | 1/2019 | Kemmerling | F02M 26/09 |

* cited by examiner

*Primary Examiner* — Long T Tran
(74) *Attorney, Agent, or Firm* — Vivacqua Crane PLLC

(57) ABSTRACT

A shutter system is provided for a vehicle having an internal combustion engine that receives forced intake air and is cooled by an engine coolant. The vehicle includes a charge air cooler system having an intercooler for cooling the intake air and an engine cooling system. The shutter system includes a shutter positioned downstream of the intercooler and an actuator for moving the shutter between first and second positions. The shutter system further includes a sensor for generating a signal associated with a temperature of the intake air and a processor for comparing the temperature to a threshold. The actuator moves the shutter to the first position in response to receiving the first signal when the temperature is below the threshold. The actuator moves the shutter to the second position in response to receiving the second signal when the temperature is above the threshold.

20 Claims, 4 Drawing Sheets

SHUTTER SYSTEM FOR A MOTOR VEHICLE

INTRODUCTION

The present disclosure relates to motor vehicles having internal combustion engines with engine cooling systems and charge air cooler systems, and more particularly, to a shutter system for controlling a flow of air to the engine cooling system and the charge air cooler system under various conditions to improve fuel economy and limit heat rejection during icing conditions.

Engine cooling systems use engine coolant to remove waste heat from the engine. The engine coolant flows through a heat exchanger, such as a radiator, which is in turn cooled by a flow of air. The engine coolant can be a mixture of water and chemicals, such as antifreeze and rust inhibitors, that reject waste heat to the flow of air passing through the radiator.

Forced induction systems deliver compressed air to the intake of the internal combustion engine. More specifically, forced induction systems can include a compressor to increase the pressure, temperature, and density of the intake air. One commonly used forced-induction compressor is a turbocharger having a centripetal compressor driven by the flow of exhaust gases. Another commonly used forced-induction compressor is a supercharger having a compressor powered directly by the rotation of the engine, usually through a belt drive. Charge air coolers are used to decrease the temperature of the compressed intake air after it has been compressed, but before the intake air enters the engine.

When the ambient temperature is below freezing, the charge air cooler system may not require any cooling and may not be configured to change the associated flow of air through the radiator and the charge air cooler. Because existing engine cooling systems and charge air coolers may not reduce the flow of air to the associated radiator and charge air cooler, ice may form in charge air cooler components or in the air path to the engine.

Thus, while existing engine cooling systems and charge air coolers achieve their intended purpose, there is a need for a new and improved shutter system for a motor vehicle that addresses these issues.

SUMMARY

According to several aspects, a shutter system for a motor vehicle is provided. The motor vehicle includes an internal combustion engine with a forced induction system supplying an intake air to the engine and the engine being cooled by an engine coolant. The motor vehicle further includes a charge air cooler system having an intercooler for cooling the intake air and an engine cooling system having a radiator for cooling the engine coolant. The shutter system includes a rear shutter mechanism positioned downstream of the intercooler and movable between first and second positions, with the radiator scavenging air flow from the intercooler when the rear shutter mechanism is disposed in the second position. The shutter system further includes a rear actuator coupled to the rear shutter mechanism for moving the rear shutter mechanism between the first and second positions. The shutter system further includes an intake air temperature sensor for generating an intake air temperature signal associated with a temperature of the intake air received by the engine. The shutter system further includes a processor coupled to the rear actuator and the intake air temperature sensor. The processor is configured to compare the temperature of the intake air to an intake air temperature threshold. The processor is further configured to generate a first rear shutter signal at least in response to the processor determining that the temperature of the intake air is below the intake air temperature threshold. The rear actuator moves the rear shutter mechanism to the first position in response to the rear actuator receiving the first rear shutter signal. The processor is further configured to generate a second rear shutter signal at least in response to the processor determining that the temperature of intake air is above the intake air temperature threshold. The rear actuator moves the rear shutter mechanism to the second position in response to the rear actuator receiving the second rear shutter signal.

In one aspect, the shutter system further includes an ambient air temperature sensor for generating an ambient air temperature signal associated with a temperature of the ambient air. The processor is coupled to the ambient air temperature sensor, and the processor is configured to compare the temperature of the ambient air to an ambient air temperature threshold. The processor is further configured to generate the second rear shutter signal at least in response to the processor determining that the temperature of the ambient air is below the ambient air temperature threshold. The processor is further configured to generate the first rear shutter signal at least in response to the processor determining that the temperature of the ambient air is above the ambient air temperature threshold.

In another aspect, the shutter system further includes a vehicle speed sensor for generating a vehicle speed signal associated with a speed of the motor vehicle. The processor is coupled to the vehicle speed sensor, and the processor is configured to compare the speed of the motor vehicle to a vehicle speed threshold. The processor is further configured to generate the first rear shutter signal at least in response to the processor determining that the speed of the motor vehicle is above the vehicle speed threshold. The processor is further configured to generate the second rear shutter signal at least in response to the processor determining that the speed of the motor vehicle is below the vehicle speed threshold.

In another aspect, the shutter system further includes a cooling fan coupled to the processor, and the cooling fan is capable of drawing air through the intercooler and supplying the air to the radiator. The processor is configured to generate a fan power signal in response to the processor determining that at least one of: the intake air temperature is above the intake air temperature threshold; the temperature of the ambient air is above the ambient air temperature threshold; and the speed of the motor vehicle is below the vehicle speed threshold. The cooling fan increases a flow of air drawn through the intercooler in response to receiving the fan power signal.

In another aspect, the shutter system further includes an engine coolant sensor coupled to the processor, and the engine coolant sensor is capable of generating an engine coolant temperature signal associated with a temperature of the engine. The processor is configured to compare the temperature of the engine coolant to an engine coolant temperature threshold. The processor is further configured to generate an adjustment signal in response to the processor determining that the temperature of the engine coolant is above the engine coolant temperature threshold. The actuator moves the rear shutter mechanism by a predetermined increment toward the second position in response to the adjustment signal, such that air can be drawn through the intercooler to the radiator.

In another aspect, the shutter system further includes a front shutter mechanism positioned upstream of the intercooler and movable between open and closed positions. The shutter system further includes a front actuator coupled to the front shutter mechanism for moving the front shutter mechanism between the open and closed positions. The processor is configured to generate a closed signal at least in response to the processor determining that the temperature of the ambient air is below the ambient air temperature threshold. The front actuator moves the front shutter mechanism to the closed position in response to the front actuator receiving the closed signal. The processor is configured to generate an open signal at least in response to the processor determining that the temperature of the ambient air is above the ambient air temperature threshold. The front actuator moves the front shutter mechanism to the open position in response to the front actuator receiving the open signal.

In another aspect, the processor is configured to generate the open signal in response to the processor determining that the speed of the motor vehicle is below the vehicle speed threshold.

According to several aspects, a motor vehicle having an internal combustion engine is provided. The engine includes a forced induction system supplying an intake air to the engine with the engine being cooled by an engine coolant. The motor vehicle includes a vehicle structure that defines a charge air cooling passage having an inlet, with the charge air cooling passage further having first and second outlets downstream of the inlet. The vehicle structure further defines an engine cooling passage fluidly connected the second outlet for scavenging air from the charge air cooling passage. The motor vehicle further includes a charge air cooler system having an intercooler disposed in the charge air passage, and the charge air cooler system is coupled to the forced induction system for cooling the intake air supplied to the engine. The motor vehicle further includes an engine cooling system having a radiator disposed in the engine cooling passage, and the engine cooling system is coupled to the engine for cooling the engine coolant flowing through a coolant circuit in the engine. The motor vehicle further includes a shutter system having a rear shutter mechanism positioned proximal to the first outlet and downstream of the intercooler. The rear shutter mechanism is movable between a first position for directing air through the first outlet and a second position. The radiator scavenges air flow from the intercooler when the rear shutter mechanism is disposed in the second position. The shutter system further includes a rear actuator coupled to the rear shutter mechanism for moving the rear shutter mechanism between the first and second positions. The shutter system further includes an intake air temperature sensor for generating an intake air temperature signal associated with a temperature of the intake air received by the engine. The shutter system further includes a processor coupled to the rear actuator and the intake air temperature sensor, and the processor is configured to compare the temperature of the intake air to an intake air temperature threshold. The processor is further configured to generate a first rear shutter signal in response to the processor determining that the temperature of the intake air is below the intake air temperature threshold. The rear actuator moves the rear shutter mechanism to the first position in response to the rear actuator receiving the first rear shutter signal. The processor is further configured to generate a second rear shutter signal at least in response to the processor determining that the temperature of intake air is above the intake air temperature threshold. The rear actuator moves the rear shutter mechanism to the second position at least in response to the rear actuator receiving the second rear shutter signal.

In one aspect, the shutter system further includes an ambient air temperature sensor for generating an ambient air temperature signal associated with a temperature of the ambient air. The processor is coupled to the ambient air temperature sensor, and the processor is configured to compare the temperature of the ambient air to an ambient air temperature threshold. The processor is further configured to generate the second rear shutter signal at least in response to the processor determining that the temperature of the ambient air is below the ambient air temperature threshold. The processor is further configured to generate the first rear shutter signal at least in response to the processor determining that the temperature of the ambient air is above the ambient air temperature threshold.

In another aspect, the shutter system further includes a vehicle speed sensor for generating a vehicle speed signal associated with a speed of the motor vehicle. The processor is coupled to the vehicle speed sensor, and the processor is configured to compare the speed of the motor vehicle to a vehicle speed threshold. The processor is configured to generate the second rear shutter signal at least in response to the processor determining that the speed of the motor vehicle is below the vehicle speed threshold. The processor is further configured to generate the first rear shutter signal at least in response to the processor determining that the speed of the motor vehicle is above the vehicle speed threshold.

In another aspect, the shutter system further includes a cooling fan coupled to the processor, and the cooling fan is capable of drawing air through the intercooler and drawing air through the radiator when the rear shutter is in the second position. The processor is configured to generate a fan power signal in response to the processor determining that the speed of the motor vehicle is below the vehicle speed threshold. The cooling fan increases a flow of air drawn through the intercooler in response to receiving the fan power signal.

In another aspect, the shutter system further includes an engine coolant sensor coupled to the processor, and the engine coolant sensor is capable of generating an engine coolant temperature signal associated with a temperature of the engine. The processor is configured to compare the temperature of the engine coolant to an engine coolant temperature threshold. The processor is further configured to generate an adjustment signal in response to the processor determining that the temperature of the engine coolant is above the engine coolant temperature threshold. The actuator moves the rear shutter mechanism by a predetermined increment toward the second position in response to the adjustment signal.

In another aspect, the shutter system further includes a front shutter mechanism positioned upstream of the intercooler and movable between open and closed positions. The shutter system further includes a front actuator coupled to the front shutter mechanism for moving the front shutter mechanism between the open and closed positions. The processor is configured to generate a closed signal at least in response to the processor determining that the temperature of the ambient air is below the ambient air temperature threshold. The front actuator moves the front shutter mechanism to the closed position in response to the front actuator receiving the closed signal. The processor is further configured to generate an open signal at least in response to the processor determining that the temperature of the ambient air is above the ambient air temperature threshold. The front actuator moves the front shutter mechanism to the open position in response to the front actuator receiving the open signal.

In another aspect, the processor is configured to generate the open signal in response to the processor determining that the speed of the motor vehicle is below the vehicle speed threshold.

According to several aspects, a method for operating a shutter system for a motor vehicle is provided. The motor vehicle includes an internal combustion engine, a charge air cooler system having an intercooler for cooling intake air received by the engine, and an engine cooling system having a radiator for cooling an engine coolant flowing through the engine. The method includes an engine cooling system flowing an engine coolant through the engine. The engine receives the intake air from a forced air induction system, and an intake air temperature sensor generates an intake air temperature signal associated with a temperature of the intake air. A processor, which is coupled to the intake air temperature sensor, compares the temperature of the intake air to an intake air temperature threshold. The processor generates a first rear shutter signal at least in response to the processor determining that the temperature of the intake air is below the intake air temperature threshold. A rear actuator, which is coupled to the processor, moves a rear shutter mechanism to a first position to allow flow downstream of an intercooler at least in response to the rear actuator receiving the first rear shutter signal. The processor generates a second rear shutter signal at least in response to the processor determining that the temperature of the intake air is above the intake air temperature threshold. The rear actuator moves the rear shutter mechanism to a second position where the radiator and cooling fan scavenge air flow from the intercooler in response to the rear actuator receiving the second rear shutter signal.

In one aspect, an ambient air temperature sensor, which is coupled to the processor, generates an ambient air temperature signal associated with a temperature of the ambient air received by the charge air cooler system. The processor compares the temperature of the ambient air to an ambient air temperature threshold. The processor generates the first rear shutter signal in further response to the processor determining that the temperature of the ambient air is above the ambient air temperature threshold. The rear actuator moves the rear shutter mechanism to the first position to allow air to flow downstream of the intercooler in response to the rear actuator receiving the first rear shutter signal. The processor generates the second rear shutter signal in further response to the processor determining that the temperature of the ambient air is below the ambient air temperature threshold. The rear actuator moves the rear shutter mechanism to the second position to block ram flow downstream of the intercooler in response to the rear actuator receiving the second rear shutter signal.

In another aspect, a vehicle speed sensor, which is coupled to the processor, generates a vehicle speed signal associated with a speed of the motor vehicle. The processor compares the speed of the motor vehicle to a vehicle speed threshold. The processor generates the first rear shutter signal in further response to the processor determining that the speed of the motor vehicle is above the vehicle speed threshold. The rear actuator moves the rear shutter mechanism to the first position to allow ram air to flow through the intercooler and the first outlet in response to the rear actuator receiving the first rear shutter signal. The processor generates the second rear shutter signal in response to the processor determining that the speed of the motor vehicle is below the vehicle speed threshold. The rear actuator moves the rear shutter mechanism to the second position to allow the cooling fan to scavenge flow from the intercooler in response to the rear actuator receiving the second rear shutter signal. A cooling fan, which is coupled to the processor and fluidly connected to the intercooler, draws air through the intercooler in response to the processor determining that the vehicle speed is below the vehicle speed threshold.

In another aspect, an engine coolant sensor, which is coupled to the processor, generates an engine coolant temperature signal associated with a temperature of the engine. The processor compares the temperature of the engine coolant to an engine coolant temperature threshold. The processor generates an adjustment signal in response to the processor determining that the temperature of the engine coolant is above the engine coolant temperature threshold. A rear actuator moves the rear shutter mechanism by a predetermined increment toward the second position to allow the radiator of the engine cooling system to scavenge air from the intercooler of the charge air cooling system in response to the rear actuator receiving the adjustment signal.

In another aspect, the processor generates an open signal in response to the processor determining at least one of: the temperature of the intake air being above the intake air temperature threshold; the temperature of the ambient air being above the ambient air temperature threshold; and the speed of the motor vehicle being below the vehicle speed threshold. A front actuator, which is coupled to the processor, moves a front shutter mechanism to an open position in response to the front actuator receiving the open signal.

In another aspect, the processor generates a closed signal in response to the processor determining that the temperature of the ambient air is below the ambient air temperature threshold. The front actuator moves the front shutter mechanism to a closed position in response to the front actuator receiving the closed signal.

Further areas of applicability will become apparent from the description provided herein. It should be understood that the description and specific examples are intended for purposes of illustration only and are not intended to limit the scope of the present disclosure.

DETAILED DESCRIPTION

Figure 1:
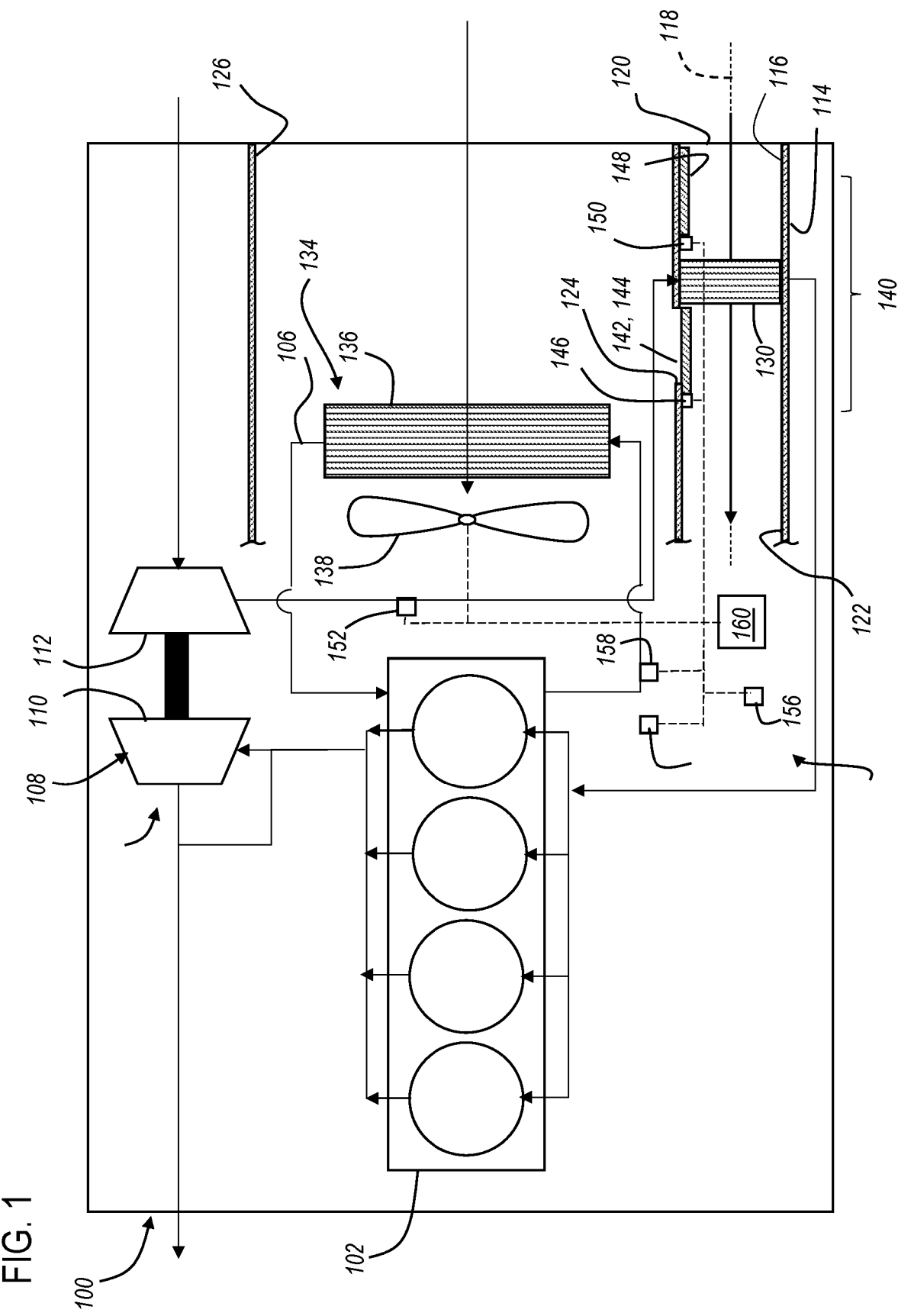
FIG. 1 is a schematic view of one example of a motor vehicle having an internal combustion engine with a shutter system for controlling a flow of air to a charge air cooling system and an engine cooling system, illustrating the shutter system having a rear shutter mechanism in a first position and a front shutter mechanism in an open position.

The following description is merely exemplary in nature and is not intended to limit the present disclosure, application, or uses. Although the drawings represent examples, the drawings are not necessarily to scale and certain features may be exaggerated to better illustrate and explain a particular aspect of an illustrative example. Any one or more of these aspects can be used alone or in combination within one another. Further, the exemplary illustrations described herein are not intended to be exhaustive or otherwise limiting or restricting to the precise form and configuration shown in the drawings and disclosed in the following detailed description. Exemplary illustrations are described in detail by reference to the drawings as follows.

Figure 2:
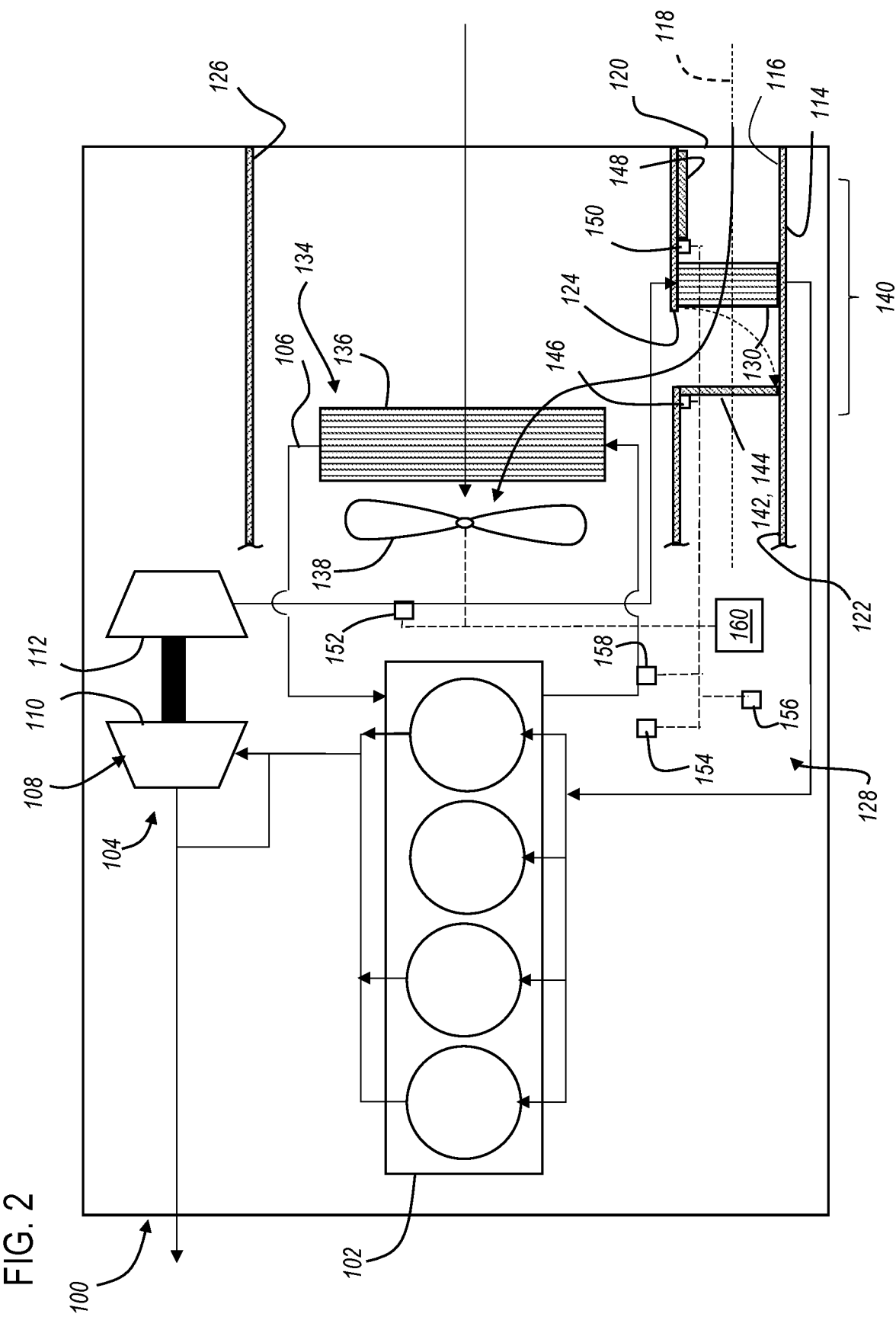
FIG. 2 is a schematic view of the shutter system of FIG. 1, illustrating the shutter system having the rear shutter mechanism in a second position and the front shutter mechanism in an open position, such that the radiator scavenges air flow from the intercooler.
Figure 3:
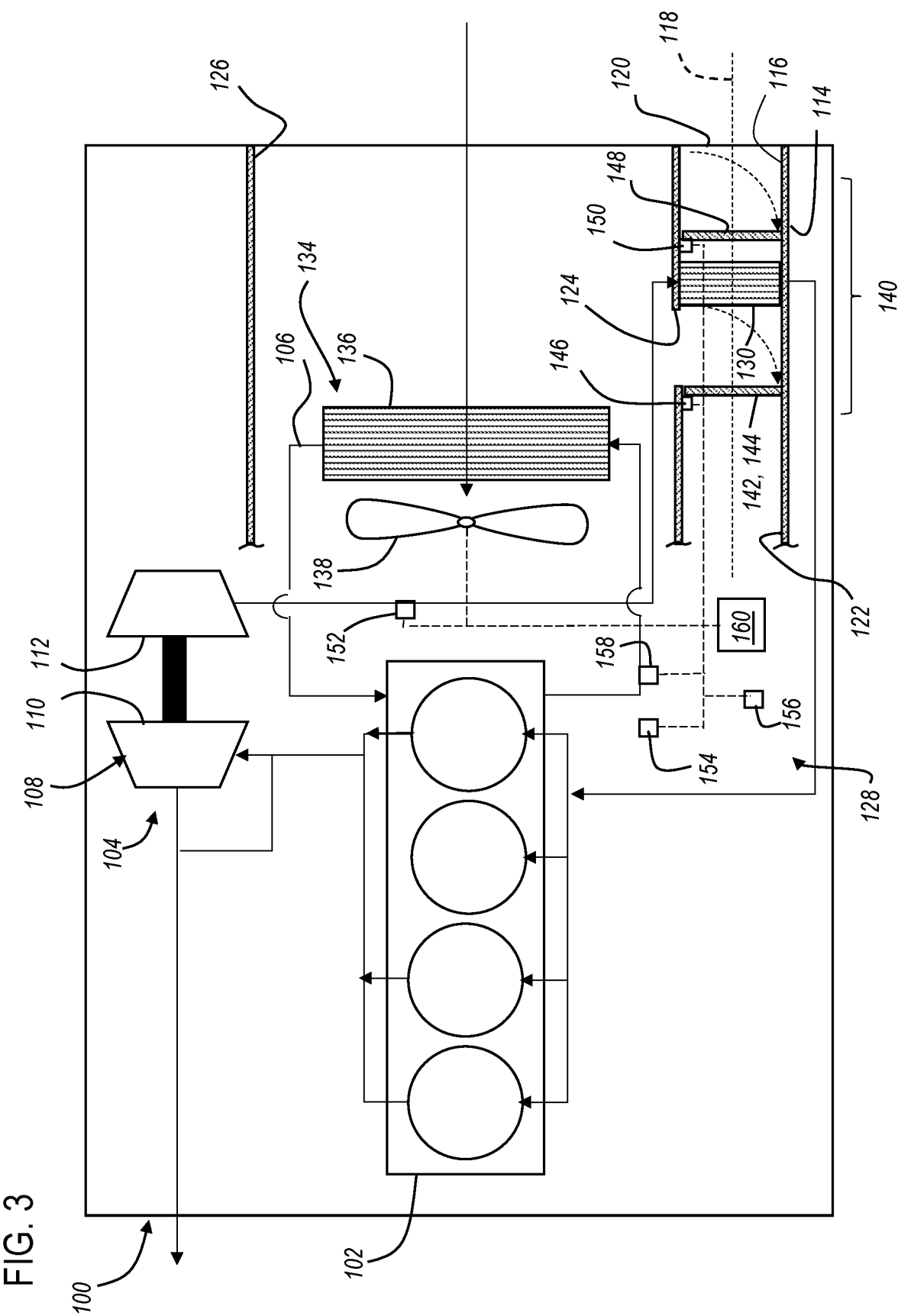
FIG. 3 is a schematic view of the shutter system of FIG. 1, illustrating the shutter system having the rear shutter mechanism in a second position and the front shutter mechanism in a closed position, such that air flow through the intercooler is blocked.

Referring to FIGS. 1-3, there is illustrated a motor vehicle 100 having an internal combustion engine 102 with a forced induction system 104 that supplies intake air to the engine 102 and a coolant circuit 106 that flows an engine coolant. In this example, the forced induction system 104 includes a turbocharger 108 with a turbine 110 spooled by exhaust gas from the engine 102 and a compressor 112 driven by the turbine 110 for compressing the intake air supplied to the engine 102. It is understood that the temperature of the intake air increases when it is compressed. In other examples, the forced air induction system can include a supercharger or other suitable components.

The motor vehicle 100 further includes a vehicle structure 114 that defines a charge air cooling passage 116 extending along a longitudinal axis 118. The charge air cooling passage 116 has an inlet 120 on one end of the axis 118 and a first outlet 122 downstream of the inlet 120 on the opposite end of the axis 118. The charge air cooling passage 116 further includes a second outlet 124 spaced radially outward from the axis. The vehicle structure 114 can further define an engine cooling passage 126 fluidly connected to the second outlet 124 for receiving air from the charge air cooling passage 116. The vehicle structure can include ducting components that define the charge air cooling passage or the engine cooling passage along other flow paths for directing air through the vehicle.

The motor vehicle 100 further includes a charge air cooler system 128 having an intercooler 130 disposed in the charge air cooling passage 116. The intercooler 130 is coupled to the forced induction system 104 for cooling the intake air that the forced induction system 104 supplies to the engine 102.

The motor vehicle 100 further includes an engine cooling system 134 having a radiator 136 disposed in the engine cooling passage 126. The radiator 136 is coupled to the engine 102 for cooling the engine coolant flowing through the engine 102. The engine cooling system 134 further includes a cooling fan 138 for drawing air into the engine cooling passage 126 and through the radiator 136. As described in detail below, the cooling fan 138 is capable of scavenging air from the intercooler and supplying the air to the radiator 136.

The motor vehicle 100 further includes a shutter system 140 having a rear shutter mechanism 142 positioned proximal to the first outlet 122 and downstream of the intercooler 130. The rear shutter mechanism 142 is movable between a first position (FIG. 1) for directing air flow through the first outlet 122 and a second position (FIGS. 2 and 3) for directing air flow through the second outlet 124, such that the radiator 136 can scavenge air flow from the intercooler 130 (FIG. 2) or air flow through the intercooler can be blocked during icing conditions (FIG. 3). In this example, the rear shutter mechanism 142 is a diverter valve, such that the diverter valve in the first position allows ram air to flow along a straight path through the charge air cooling passage 116. The diverter valve 144 in the second position allows air to flow from the charge air cooling passage 116 to the engine cooling passage 126, such that the engine cooling system 134 scavenges airflow from the charge air cooling passage 116. In other examples, the rear shutter mechanism can be shutters, a damper, or other suitable air flow control mechanisms. The shutter system 140 further includes a rear actuator 146 coupled to the rear shutter mechanism 142 for moving the rear shutter mechanism 142 between the first and second positions.

In this example, the shutter system 140 further includes a front shutter mechanism 148 positioned upstream of the intercooler 130 and adjacent to the inlet 120 of the charge air cooling passage 116. The front shutter mechanism 148 is movable between an open position (FIGS. 1 and 2) for allowing air to flow through the inlet 120 into the charge air cooling passage 116 and a closed position (FIG. 3) for preventing air to enter the charge air cooling passage 116 through the inlet 120. The front shutter mechanism 148 includes a front actuator 150 coupled to the front shutter mechanism 148 for moving the front shutter mechanism 148 between the open and closed positions. It is contemplated that other examples of the shutter system may not include the front shutter mechanism, or that the front shutter mechanism may additionally block some portion of the radiator.

The shutter system 140 further includes one or more sensors for measuring vehicle characteristics associated with engine cooling and charge air cooling. In this example, the shutter system 140 includes an intake air temperature sensor 152 for generating an intake air temperature signal associated with a temperature of the intake air received by the engine 102. The shutter system 140 further includes an ambient air temperature sensor 154 for generating an ambient air temperature signal associated with a temperature of the ambient air. The shutter system 140 further includes a vehicle speed sensor 156 for generating a vehicle speed signal associated with a speed of the motor vehicle 100. The shutter system 140 further includes an engine coolant sensor 158 capable of generating an engine coolant temperature signal associated with a temperature of the engine 102.

The shutter system 140 further includes a processor 160 coupled to the sensors for controlling the rear and front actuators in response to the measured parameters. Continuing with the previous example, the processor is coupled to the rear actuator 146 and the intake air temperature sensor 152. The processor 160 is configured to compare the temperature of the intake air to an intake air temperature threshold. In this example, intake air temperature threshold is 100 degrees Fahrenheit. However, it is contemplated that the threshold can be above or below 100 degrees Fahrenheit. The processor 160 is configured to generate a first rear shutter signal at least in response to the processor 160 determining that the temperature of intake air is below the intake air temperature threshold. The rear actuator 146 moves the rear shutter mechanism 142 to the first position at least in response to the rear actuator receiving the first rear shutter signal. The processor 160 is configured to generate a second rear shutter signal in response to the processor determining that the temperature of the intake air is above the intake air temperature threshold. The rear actuator 146 moves the rear shutter mechanism 142 to the second position in response to the rear actuator receiving the second rear shutter signal.

The processor 160 is further coupled to an ambient air temperature sensor 154, and the processor 160 is configured to compare the temperature of the ambient air to an ambient air temperature threshold. In this example, ambient air temperature threshold is 32 degrees Fahrenheit. However, it is contemplated that the threshold can be above or below 32 degrees Fahrenheit. The processor 160 is configured to generate the second rear shutter signal at least in response to the processor 160 determining that the temperature of the ambient air is below the ambient air temperature threshold. The processor 160 is configured to generate the first rear shutter signal at least in response to the processor 160 determining that the temperature of the ambient air is above the ambient air temperature threshold.

The processor 160 is further coupled to the vehicle speed sensor 156, and the processor 160 is configured to compare the speed of the motor vehicle 100 to a vehicle speed threshold. In this example, vehicle speed threshold is 25 miles per hour. However, it is contemplated that the threshold can be above or below 25 miles per hour. The processor 160 is configured to generate the second rear shutter signal at least in response to the processor 160 determining that the speed of the motor vehicle is below the vehicle speed threshold. The processor 160 is configured to generate the first rear shutter signal at least in response to the processor 160 determining that the speed of the motor vehicle is above the vehicle speed threshold.

The processor 160 is further coupled to the cooling fan 138, and the processor 160 is configured to generate a fan power signal in response to the processor determining that the intake air temperature is above the intake air temperature threshold, the temperature of the ambient air is above the ambient air temperature threshold, or the speed of the motor vehicle is below the vehicle speed threshold. The cooling fan 138 increases a flow of air drawn through the intercooler 130 and scavenged by the radiator in response to the cooling fan 138 receiving the fan power signal.

The processor 160 is further coupled to the engine coolant sensor 158, and the processor 160 is configured to compare the temperature of the engine coolant to an engine coolant temperature threshold. The processor 160 is configured to generate an adjustment signal in response to the processor 160 determining that the temperature of the engine coolant is above the engine coolant temperature threshold. The rear actuator 146 moves the rear shutter mechanism 142 by a predetermined increment toward the second position to permit the engine cooling passage 126 to scavenge air from the charge air cooling passage 116 in response to the adjustment signal.

The processor is further coupled to the front actuator 150, and the processor 160 is configured to generate a closed signal at least in response to the processor 160 determining that the temperature of the ambient air is below the ambient air temperature threshold. The front actuator 150 moves the front shutter mechanism 148 to the closed position in response to the front actuator 150 receiving the closed signal. Non-limiting benefits of closing the rear and front shutter mechanisms 142, 148 can include limiting heat rejection during icing conditions. The processor 160 is configured to generate an open signal at least in response to the processor 160 determining that speed of the motor vehicle is below the vehicle speed threshold and the temperature of the ambient air is above the ambient air temperature threshold. The front actuator 150 moves the front shutter mechanism 148 to the open position in response to the front actuator 150 receiving the open signal. Non-limiting benefits of opening the rear and front shutter mechanisms 142, 148 can include improvements to vehicle performance and fuel economy.

Figure 4:
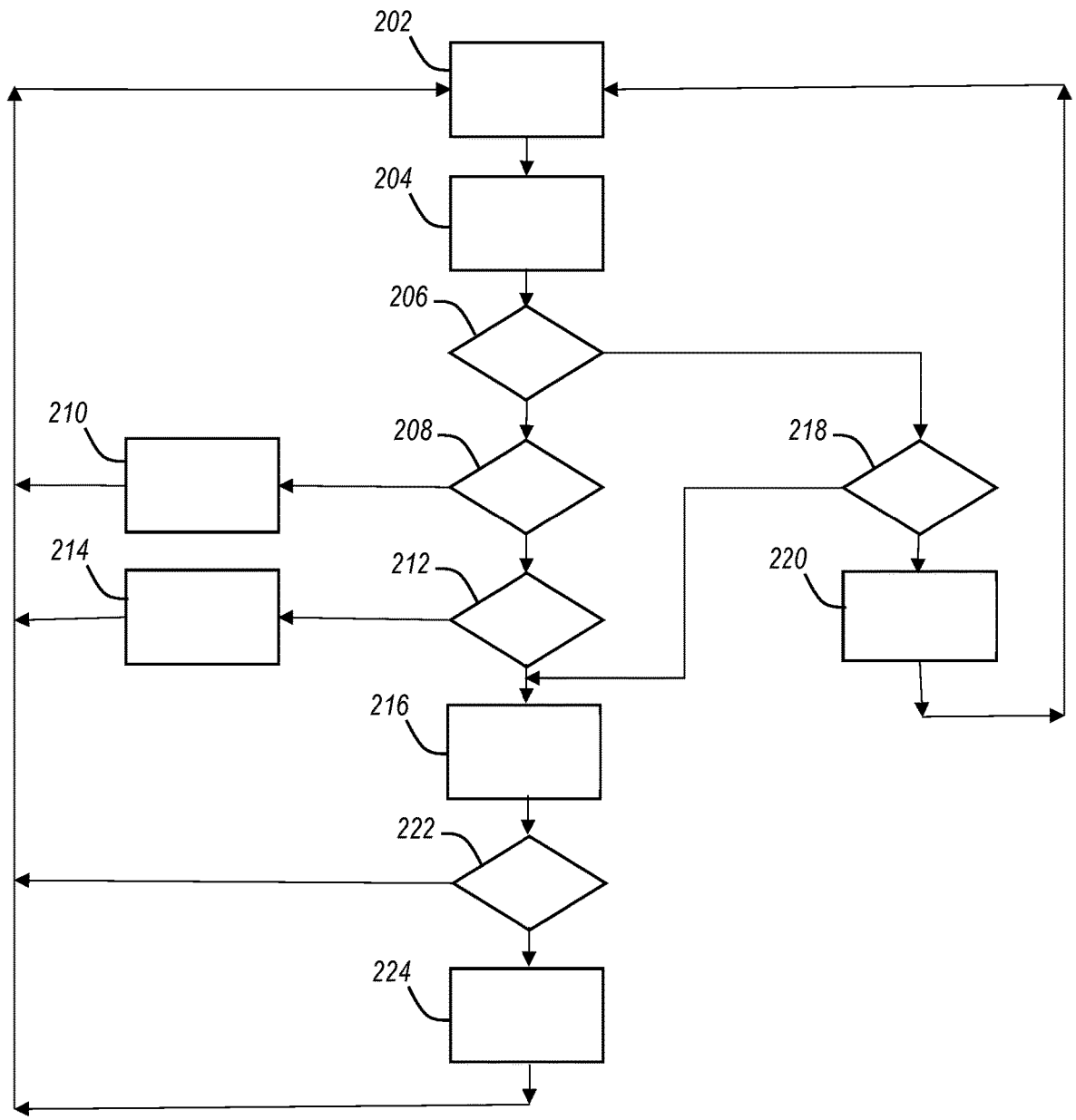
FIG. 4 is a flow chart of one example of a method of operating the shutter system of FIG. 1.

Referring to FIG. 4, there is illustrated a flow chart of one example of a method 200 for operating the motor vehicle 100 and shutter system 140 of FIGS. 1-3. The method 200 commences at block 202 with the engine 102 receiving the intake air from the forced induction system 104, and the engine cooling system 134 flowing the engine coolant through the engine 102.

At block 204, one or more sensors are used to detect parameters that the processor 160 uses to perform comparisons or calculations for operating the shutter system 140. In this example, the intake air temperature sensor 152 generates the intake air temperature signal associated with the temperature of the intake air. The ambient air temperature sensor 154 generates the ambient air temperature signal associated with the temperature of the ambient air received by the charge air cooler system 128. The vehicle speed sensor 156 generates the vehicle speed signal associated with the speed of the motor vehicle 100. The engine coolant sensor 158 generates the engine coolant temperature signal associated with the temperature of the engine 102.

At block 206, the processor 160 compares the temperature of the intake air to the intake air temperature threshold. In this example, the threshold is 100 degrees Fahrenheit. However, the threshold can be above or below 100 degrees Fahrenheit. If the intake air temperature is above the intake air temperature threshold, the method 200 proceeds to block 208. If the intake air temperature is below the intake air temperature threshold, the method 200 proceeds to block 218.

At block 208, the processor 160 compares the temperature of the ambient air to the ambient air temperature threshold. In this example, the threshold is 32 degrees Fahrenheit. However, the threshold can be above or below 32 degrees Fahrenheit. If the ambient temperature is below the ambient temperature threshold, the method 200 proceeds to block 210. If the ambient temperature is above the ambient temperature threshold, the method 200 proceeds to block 212.

At block 210, the processor 160 generates the first rear shutter signal, and the rear actuator 146 moves the rear shutter mechanism 142 to the first position to allow passive flow downstream of the intercooler 130 in response to the rear actuator 146 receiving the first rear shutter signal.

At block 212, the processor 160 compares the speed of the motor vehicle 100 to the vehicle speed threshold. In this example, the threshold is 25 miles per hour. However, the threshold can be above or below 25 miles per hour. If the vehicle speed is below the vehicle speed threshold, the method 200 proceeds to block 214. If the vehicle speed is above the vehicle speed threshold, the method 200 proceeds to block 216.

At block 214, the processor 160 generates the open signal, and the front actuator 150 moves the front shutter mechanism 148 to the open position to allow air to flow through the intercooler 130 in response to the front actuator receiving the open signal. The processor 160 generates the second rear shutter signal, and the rear actuator 146 moves the rear shutter mechanism 142 to the second position to direct flow from the intercooler 130 to the radiator in response to the rear actuator receiving the second rear shutter signal. The processor increases power supplied to the cooling fan 138, such that the cooling fan 138 draws air from the charge air cooling passage 116 to supply airflow through the intercooler 130 and the radiator 136.

At block 216, the processor 160 generates the open signal, and the front actuator 150 moves the front shutter mechanism 148 to the open position to allow air to enter the inlet 120 and flow through the intercooler 130. The processor 160 generates the first rear shutter signal, and the rear actuator 146 moves the rear shutter mechanism 142 to the first position to allow air to flow through the intercooler 130 and the first outlet 122, when the dynamic air pressure caused by vehicle motion produces mass flow through the intercooler, such that assistance from the cooling fan 138 may be unnecessary.

At block 218, the processor 160 compares the temperature of the ambient air to the ambient air temperature threshold. In this example, the threshold is 32 degrees Fahrenheit. However, the threshold can be above or below 32 degrees Fahrenheit. If the ambient temperature is below the ambient temperature, the method 200 proceeds to block 220. If the ambient temperature is above the ambient temperature, the method 200 proceeds to block 216.

At block 220, the processor 160 generates the closed signal, and the front actuator 150 moves the front shutter mechanism 148 to the closed position to block flow upstream of the intercooler 130. The processor 160 generates the second rear shutter signal, and the rear actuator 146 moves the rear shutter mechanism 142 to the second position to block ram flow downstream of the intercooler 130. Because both the rear and front shutter mechanisms prevent airflow through the intercooler, heat rejection can be limited during icing conditions.

At block 222, the processor 160 compares the temperature of the engine coolant to an engine coolant temperature threshold. The threshold can be a fixed value, a calculated value, or a plurality of values in a lookup table. If the temperature of the engine coolant is above the threshold, the method 200 proceeds to block 224. If the temperature of the engine coolant is below the threshold, the method 200 returns to block 202.

At block 224, the processor 160 generates the adjustment signal. The rear actuator 146 moves the rear shutter mechanism 142 by a predetermined increment toward the second position to allow the radiator 136 of the engine cooling system 134 to scavenge air from the intercooler 130 of the charge air cooling system, in response to the adjustment signal.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A shutter system for a motor vehicle having an internal combustion engine with a forced induction system supplying an intake air to the engine and the engine being cooled by an engine coolant, with the motor vehicle further including a charge air cooler system having an intercooler for cooling the intake air and an engine cooling system having a radiator for cooling the engine coolant, the shutter system comprising:
    a rear shutter mechanism positioned downstream of the intercooler and movable between first and second positions, with the radiator scavenging a flow of the intake air from the intercooler when the rear shutter mechanism is disposed in the second position;
    a rear actuator coupled to the rear shutter mechanism for moving the rear shutter mechanism between the first and second positions;
    an intake air temperature sensor for generating an intake air temperature signal associated with a temperature of the intake air received by the engine; and
    a processor coupled to the rear actuator and the intake air temperature sensor, and the processor being configured to:
        compare the temperature of the intake air to an intake air temperature threshold;
        generate a first rear shutter signal at least in response to the processor determining that the temperature of the intake air is below the intake air temperature threshold; and
        generate a second rear shutter signal at least in response to the processor determining that the temperature of the intake air is above the intake air temperature threshold;
    wherein the rear actuator moves the rear shutter mechanism to the first position in response to the rear actuator receiving the first rear shutter signal, and the rear actuator moves the rear shutter mechanism to the second position in response to the rear actuator receiving the second rear shutter signal.

2. The shutter system of claim 1 further comprising:
    an ambient air temperature sensor for generating an ambient air temperature signal associated with a temperature of an ambient air;
    wherein the processor is coupled to the ambient air temperature sensor, and the processor is configured to:
        compare the temperature of the ambient air to an ambient air temperature threshold; and
        generate the first rear shutter signal at least in response to the processor determining that the temperature of the ambient air is above the ambient air temperature threshold; and
        generate the second rear shutter signal at least in response to the processor determining that the temperature of the ambient air is below the ambient air temperature threshold.

3. The shutter system of claim 2 further comprising:
    a vehicle speed sensor for generating a vehicle speed signal associated with a speed of the motor vehicle;
    wherein the processor is coupled to the vehicle speed sensor, and the processor is configured to:
        compare the speed of the motor vehicle to a vehicle speed threshold;
        generate the first rear shutter signal at least in response to the processor determining that the speed of the motor vehicle is above the vehicle speed threshold; and
        generate the second rear shutter signal at least in response to the processor determining that the speed of the motor vehicle is below the vehicle speed threshold.

4. The shutter system of claim 3 further comprising:
    a cooling fan coupled to the processor, and the cooling fan is capable of drawing the intake air through the intercooler when the rear shutter is disposed in the second position, and supplying the intake air to the radiator;
    wherein the processor is configured to generate a fan power signal in response to the processor determining that at least one of:
        the intake air temperature is above the intake air temperature threshold;
        the temperature of the ambient air is above the ambient air temperature threshold; and
        the speed of the motor vehicle is below the vehicle speed threshold;
    wherein the cooling fan increases the flow of the intake air drawn through the intercooler in response to receiving the fan power signal.

5. The shutter system of claim 4 further comprising:
an engine coolant sensor coupled to the processor, and the engine coolant sensor is capable of generating an engine coolant temperature signal associated with a temperature of the engine;
wherein the processor is configured to:
compare the temperature of the engine coolant to an engine coolant temperature threshold; and
generate an adjustment signal in response to the processor determining that the temperature of the engine coolant is above the engine coolant temperature threshold;
wherein the rear actuator moves the rear shutter mechanism by a predetermined increment toward the second position in response to the adjustment signal.

6. The shutter system of claim 5 further comprising:
a front shutter mechanism positioned upstream of the intercooler and movable between open and closed positions; and
a front actuator coupled to the front shutter mechanism for moving the front shutter mechanism between the open and closed positions;
wherein the processor is configured to generate a closed signal at least in response to the processor determining that the temperature of the ambient air is below the ambient air temperature threshold, and the processor is configured to generate an open signal at least in response to the processor determining that the temperature of the ambient air is above the ambient air temperature threshold;
wherein the front actuator moves the front shutter mechanism to the closed position in response to the front actuator receiving the closed signal, and the front actuator moves the front shutter mechanism to the open position in response to the front actuator receiving the open signal.

7. The shutter system of claim 6 wherein the processor is configured to generate the open signal at least in response to the processor determining that the speed of the motor vehicle is below the vehicle speed threshold.

8. A motor vehicle having an internal combustion engine with a forced induction system supplying an intake air to the engine and a coolant circuit for flowing an engine coolant, the motor vehicle comprising:
a vehicle structure defining:
a charge air cooling passage having an inlet, with the charge air cooling passage further having first and second outlets downstream of the inlet; and
an engine cooling passage fluidly connected the second outlet for receiving air from the charge air cooling passage;
a charge air cooler system having an intercooler disposed in the charge air cooling passage, and the charge air cooler system is coupled to the forced induction system for cooling the intake air supplied to the engine;
an engine cooling system having a radiator disposed in the engine cooling passage, and the engine cooling system is coupled to the engine for cooling the engine coolant flowing through the coolant circuit in the engine; and
a shutter system comprising:
a rear shutter mechanism positioned proximal to the first outlet and downstream of the intercooler, with the rear shutter mechanism being movable between a first position for directing air through the first outlet and a second position, with the radiator scavenging a flow of the intake air from the intercooler when the rear shutter mechanism is disposed in the second position;
a rear actuator coupled to the rear shutter mechanism for moving the rear shutter mechanism between the first and second positions;
an intake air temperature sensor for generating an intake air temperature signal associated with a temperature of the intake air received by the engine; and
a processor coupled to the rear actuator and the intake air temperature sensor, and the processor is configured to:
compare the temperature of the intake air to an intake air temperature threshold;
generate a first rear shutter signal at least in response to the processor determining that the temperature of the intake air is below the intake air temperature threshold; and
generate a second rear shutter signal at least in response to the processor determining that the temperature of the intake air is above the intake air temperature threshold;
wherein the rear actuator moves the rear shutter mechanism to the first position at least in response to the rear actuator receiving the first rear shutter signal, and the rear actuator moves the rear shutter mechanism to the second position in response to the rear actuator receiving the second rear shutter signal.

9. The motor vehicle of claim 8 wherein the shutter system further comprises:
an ambient air temperature sensor for generating an ambient air temperature signal associated with a temperature of an ambient air;
wherein the processor is coupled to the ambient air temperature sensor, and the processor is configured to:
compare the temperature of the ambient air to an ambient air temperature threshold;
generate the first rear shutter signal at least in response to the processor determining that the temperature of the ambient air is above the ambient air temperature threshold; and
generate the second rear shutter signal at least in response to the processor determining that the temperature of the ambient air is below the ambient air temperature threshold.

10. The motor vehicle of claim 9 wherein the shutter system further comprises:
a vehicle speed sensor for generating a vehicle speed signal associated with a speed of the motor vehicle;
wherein the processor is coupled to the vehicle speed sensor, and the processor is configured to:
compare the speed of the motor vehicle to a vehicle speed threshold; and
generate the first rear shutter signal at least in response to the processor determining that the speed of the motor vehicle is above the vehicle speed threshold; and
generate the second rear shutter signal at least in response to the processor determining that the speed of the motor vehicle is below the vehicle speed threshold.

11. The motor vehicle of claim 10 wherein the shutter system further comprises:
a cooling fan coupled to the processor, and the cooling fan is capable of drawing air through the intercooler and supplying the intake air to the radiator;

wherein the processor is configured to generate a fan power signal at least in response to the processor determining that the speed of the motor vehicle is below the vehicle speed threshold;

wherein the cooling fan increases the flow of the intake air drawn through the intercooler in response to receiving the fan power signal.

12. The motor vehicle of claim 11 wherein the shutter system further comprises:
an engine coolant sensor coupled to the processor, with the engine coolant sensor capable of generating an engine coolant temperature signal associated with a temperature of the engine;
wherein the processor is configured to:
compare the temperature of the engine coolant to an engine coolant temperature threshold; and
generate an adjustment signal in response to the processor determining that the temperature of the engine coolant is above the engine coolant temperature threshold;
wherein the rear actuator moves the rear shutter mechanism by a predetermined increment toward the second position in response to the adjustment signal.

13. The motor vehicle of claim 12 wherein the shutter system further comprises:
a front shutter mechanism positioned upstream of the intercooler and movable between open and closed positions; and
a front actuator coupled to the front shutter mechanism for moving the front shutter mechanism between the open and closed positions;
wherein the processor is configured to generate a closed signal at least in response to the processor determining that the temperature of the ambient air is below the ambient air temperature threshold, and the front actuator moves the front shutter mechanism to the closed position in response to the front actuator receiving the closed signal;
wherein the processor is configured to generate an open signal at least in response to the processor determining that the temperature of the ambient air is above the ambient air temperature threshold, and the front actuator moves the front shutter mechanism to the open position in response to the front actuator receiving the open signal.

14. The motor vehicle of claim 13 wherein the processor is configured to generate the open signal at least in response to the processor determining that the speed of the motor vehicle is below the vehicle speed threshold.

15. A method for operating a shutter system for a motor vehicle, with the motor vehicle having an internal combustion engine, a charge air cooler system including an intercooler for cooling an intake air received by the engine, and an engine cooling system having a radiator for cooling an engine coolant flowing through the engine, the method comprising:
receiving, by the engine, the intake air from a forced air induction system;
flowing, using an engine cooling system, an engine coolant through the engine;
generating, using an intake air temperature sensor, an intake air temperature signal associated with a temperature of the intake air;
comparing, using a processor coupled to the intake air temperature sensor, the temperature of the intake air to an intake air temperature threshold;

generating, using the processor, a first rear shutter signal at least in response to the processor determining that the temperature of the intake air is below the intake air temperature threshold;
moving, using a rear actuator coupled to the processor, a rear shutter mechanism to a first position to allow the intake air to flow downstream of an intercooler at least in response to the rear actuator receiving the first rear shutter signal;
generating, using the processor, a second rear shutter signal at least in response to the processor determining that the temperature of the intake air is above the intake air temperature threshold; and
moving, using the rear actuator, the rear shutter mechanism to a second position where the radiator scavenges a flow of the intake air from the intercooler in response to the rear actuator receiving the second rear shutter signal.

16. The method of claim 15 further comprising:
generating, using an ambient air temperature sensor coupled to the processor, an ambient air temperature signal associated with a temperature of an ambient air received by the charge air cooler system;
comparing, using the processor, the temperature of the ambient air to an ambient air temperature threshold;
generating, using the processor, the first rear shutter signal in further response to the processor determining that the temperature of the ambient air is above the ambient air temperature threshold;
moving, using the rear actuator, the rear shutter mechanism to the first position to allow the intake air to flow downstream of the intercooler in response to the rear actuator receiving the first rear shutter signal;
generating, using the processor, the second rear shutter signal in further response to the processor determining that the temperature of the ambient air is below the ambient air temperature threshold; and
moving, using the rear actuator, the rear shutter mechanism to the second position to block the intake air from flowing downstream of the intercooler in response to the rear actuator receiving the second rear shutter signal.

17. The method of claim 16 further comprising:
generating, using a vehicle speed sensor coupled to the processor, a vehicle speed signal associated with a speed of the motor vehicle;
comparing, using the processor, the speed of the motor vehicle to a vehicle speed threshold;
generating, using the processor, the first rear shutter signal in further response to the processor determining that the speed of the motor vehicle is above the vehicle speed threshold;
moving, using the rear actuator, the rear shutter mechanism to the first position to allow the intake air to flow through the intercooler and a first outlet in response to the rear actuator receiving the first rear shutter signal;
generating, using the processor, the second rear shutter signal in further response to the processor determining that the speed of the motor vehicle is below the vehicle speed threshold;
moving, using the rear actuator, the rear shutter mechanism to the second position to block the intake air from flowing downstream of the intercooler in response to the rear actuator receiving the second rear shutter signal; and
drawing, using a cooling fan coupled to the processor and fluidly connected to the intercooler, air through the intercooler in response to the processor determining that the vehicle speed is below the vehicle speed threshold.

18. The method of claim 17 further comprising:

generating, using an engine coolant sensor coupled to the processor, an engine coolant temperature signal associated with a temperature of the engine;

comparing, using the processor, the temperature of the engine coolant to an engine coolant temperature threshold;

generating, using the processor, an adjustment signal in response to the processor determining that the temperature of the engine coolant is above the engine coolant temperature threshold; and moving, using a rear actuator, the rear shutter mechanism by a predetermined increment toward the second position to allow the radiator of the engine cooling system to scavenge air from the intercooler of the charge air cooling system in response to the rear actuator receiving the adjustment signal.

19. The method of claim 18 further comprising:

generating, using the processor, an open signal in response to the processor determining at least one of:
  the temperature of the intake air being above the intake air temperature threshold;
  the temperature of the ambient air being above the ambient air temperature threshold; and
  the speed of the motor vehicle being below the vehicle speed threshold; and moving, using a front actuator coupled to the processor, a front shutter mechanism to an open position in response to the front actuator receiving the open signal.

20. The method of claim 19 further comprising:

generating, using the processor, a closed signal in response to the processor determining that the temperature of the ambient air is below the ambient air temperature threshold; and moving, using the front actuator, the front shutter mechanism to a closed position in response to the front actuator receiving the closed signal.

* * * * *